United States Patent [19]

Mori et al.

[11] 4,229,292

[45] Oct. 21, 1980

[54] COUNTERCURRENT LIQUID-SOLID CONTACTING APPARATUS

[75] Inventors: Shoichi Mori; Yorifumi Ikeda, both of Suita; Kikuo Nishikawa, Neyagawa, all of Japan

[73] Assignee: Takeda Chemical Industries, Ltd., Osaka, Japan

[21] Appl. No.: 865,328

[22] Filed: Dec. 28, 1977

[30] Foreign Application Priority Data

Dec. 31, 1976 [JP] Japan .................. 51-158048

[51] Int. Cl.² .......................................... B01D 15/06
[52] U.S. Cl. .................................. 210/673; 210/676; 210/140; 210/189; 210/191; 210/274; 210/279
[58] Field of Search ............... 210/33, 189, 190, 268, 210/275, 279, 80, 81, 284–287, 274, 97, 191, 138, 139, 140, 31 R, 32; 23/283, 284

[56] References Cited

U.S. PATENT DOCUMENTS

| | | | |
|---|---|---|---|
| 3,512,640 | 5/1970 | Hellmann | 210/80 |
| 3,674,685 | 7/1972 | Arden et al. | 210/33 |
| 3,741,390 | 6/1973 | Wallace et al. | 210/274 X |

*Primary Examiner*—Ferris H. Lander

*Attorney, Agent, or Firm*—Wenderoth, Lind & Ponack

[57] ABSTRACT

A countercurrent liquid-solid contacting apparatus comprises a liquid purifying column for substantially purifying a liquid by passing the liquid upwardly through a bed of purifying material and a regenerating column for regenerating the purifying material used fo purify the liquid. The liquid purifying column includes supply and transfer ports defined respectively at the top and bottom thereof and has therein the bed of purifying material which is spaced a predetermined distance from the top of the liquid treating column to provide a vacant space. The purifying column further includes a liquid inlet and outlet with a portion of the purifying bed above the liquid outlet serving as a settling layer to avoid any possible fluidization and/or expansion of the purifying material. The regenerating column is similar in construction to the construction of the purifying column, however, compressed air and washing liquid are successively or simultaneously supplied into the regenerating column to fluidize the soiled purifying material and separate suspended solids from the soiled purifying particles. The regenerated purifying material is continuously or intermittently supplied into the purifying column. A method therefor is also disclosed.

15 Claims, 6 Drawing Figures

COUNTERCURRENT LIQUID-SOLID CONTACTING APPARATUS

BACKGROUND OF THE INVENTION

The present invention generally relates to a method and an apparatus for countercurrent contact between a liquid to be purified and a bed of solid purifying material. More particularly, the present invention relates to a method and an apparatus for the separation of suspended solids out of the liquid by passing the liquid through the bed of purifying material in the form of solid particles.

The U.S. Pat. No. 3,512,640, patented on May 19, 1970, discloses a method and an apparatus for purifying a liquid, such as sewage or industrial liquid waste, by passing the liquid upwardly through a bed of purifying material within a liquid treating column, withdrawing a purified liquid from the bed before it has reached the uppermost surface of the bed, and pumping some of the withdrawn liquid onto the top of the bed to avoid any possible fluidization and/or expansion of the purifying particles forming the bed.

The U.S. Pat. No. 3,512,640 further discloses the possibility of replenishing some of the purifying material, which has already been soiled by suspended solids contained in the liquid being treated or purified and which is located particularly in the region of entry of the liquid into the treating column, with a fresh purifying material, the amount of the latter corresponding to the amount of the some of the purifying material. For this purpose, the apparatus is designed so that the purifying material, which has been soiled by the suspended solids in contact with the liquid being treated, can be discharged from the bottom of the treating column on one hand and a fresh purifying material can be supplied into the treating column from above and onto the uppermost surface of the bed in an amount corresponding to the amount of the purifying material discharged.

With this apparatus, the supply of the liquid to be purified must be interrupted during the entire period of time in which the discharge of the soiled purifying material takes place. Moreover, in order to effect the discharge of the soiled purifying material from the bottom of the treating column, a pressure differential must be created between the bed, that is, the interior of the liquid treating column, and the external region, that is, the inside of an exhaust piping extending from the bottom of the liquid treating column so that the soiled particles can move out of the treating column from the bottom thereof into the exhaust piping where the lower pressure is created relative to the pressure in the liquid treating column.

Because of the necessity of the pressure differential to be established for facilitating the discharge of the soiled purifying material during the replenishment, the supply of the fresh purifying material and the discharge of the soiled purifying material must be effected at a different time, that is, the supply of the fresh purifying material is followed by the discharge of the soiled purifying material.

On the other hand, during normal operation of the apparatus, some of the purified liquid, which has been drawn out of the bed from a liquid outlet defined in the treating column at a position substantially intermediate of the height of the bed, must be recycled into the treating column and onto the uppermost surface of the bed so that the recycled liquid, while flowing downwards through an upper portion of the bed above the level of the liquid outlet, can serve as a hydraulic means to prevent fluidization of the bed particles, thereby maintaining the bed in a compact condition. The amount of the recycled liquid is usually twice the amount of the liquid to be purified which is supplied upwardly through a lower portion of the bed below the level of the liquid outlet.

In view of the foregoing, not only is the apparatus of the above described U.S. patent complicated, but also the purifying capacity is limited to a relatively low value.

Furthermore, the above described U.S. patent discloses neither the employment of a regenerating device for regenerating, i.e., washing, chemically rinsing or heat-treating to refresh, the soiled purifying particles for reuse nor the employment of the regenerating device in combination with the liquid treating column.

Apart from the liquid treating column of a particular construction which may be employed in the present invention, there is well known a regenerating device which comprises a washing column having a supply opening at its top and a discharge port at its bottom. This known washing column is designed so that a batch of purifying material supplied into the washing column through the supply opening can be fluidized by a washing or rinsing liquid supplied into the washing column from the bottom thereof and flowing upwards through a bed of the purifying material to be washed. By positively fluidizing the purifying material within the washing column, suspended solids sticking to particles of the purifying material can be separated therefrom by the friction among the purifying particles being fluidized.

However, it is believed that combination of the liquid treating column of a construction disclosed in the above mentioned U.S. patent with the known washing column of the construction described above does not make the present invention obvious.

SUMMARY OF THE INVENTION

The present invention has for its essential object the provision of an apparatus for purifying a liquid to be purified by the use of a bed of purifying material in the form of a mass of purifying particles and also for periodically purifying or regenerating some of the purifying material, which has been soiled by suspended solids, without requiring complicated operating procedures.

Another object of the present invention is to provide an apparatus of the type referred to above, wherein purification or regeneration of the soiled purifying material is effected by passing a washing liquid upwards through a bed of the soiled purifying material to positively fluidize the latter so that the suspended solids can be separated from the purifying particles. The washing liquid, which has been used to wash the purifying material and, therefore, carries the separated suspended solids, is discharged from the regenerating column either by a siphon phenomenon or by an overflow.

A further object of the present invention is to provide an apparatus of the type referred to above having a relatively high purifying efficiency, wherein separation of suspended solids out of the liquid to be purified can be carried out without the increased expenses for the apparatus and is also economical and environmentally acceptable.

It is a related object of the present invention to provide a method of countercurrent contact between a liquid to be purified and a bed of soild purifying particles and also between a washing liquid and a bed of the purifying particles which have been soiled by suspended solids separated from the liquid to be purified during purification of the latter.

It is another related object of the present invention to provide a method of the type referred to above which can be continuously performed with the apparatus of the construction herein disclosed.

To this end, the apparatus according to the present invention generally comprises a purifying or liquid treating column and a regenerating column connected in series with the liquid treating column. The liquid treating column has therein a bed of purifying material through which a liquid to be purified is passed upwardly, the purified liquid being discharged to the outside of the liquid treating column. A portion of the purifying material forming the bed within the liquid treating column, which is situated above the level of the liquid outlet in the liquid treating column, serves to suppress the remaining portion of the bed to avoid any possible undesirable fluidization and/or expansion of the purifying material.

A portion of the purifying material located in a lower region of the liquid treating column adjacent a liquid supply port through which the liquid to be purified is introduced into the liquid treating column is, when soiled by suspended solids contained in and subsequently removed from the liquid to be purified, discharged from the bottom of the bed into the regenerating column for regenerating the purifying particles so soiled.

The regenerating column is constructed so that, after the soiled purifying material has been transferred from the liquid treating column and introduced thereinto from the top thereof, the soiled purifying particles can be fluidized by the successive or simultaneous application of a compressed air and a washing liquid which are supplied into the regenerating column through the bottom thereof. With the compressed air and washing liquid so supplied successively or simultaneously, fluidization of the soiled purifying particles results in separation of suspended solids from the soiled purifying particles, which suspended solids are removed from the regenerating column through a liquid outlet which is defined in the regenerating column. Preferably, the liquid outlet in the regenerating column is communicated to a siphon piping. Alternatively, where the regenerating column is an open-topped vessel, the liquid outlet in the regenerating column may be constituted by an overflow trough mounted on the top of the regenerating column.

When the compressed air and the washing liquid are successively supplied into the regenerating column, the supply of the compressed air should be continued for a predetermined period of time, followed by the supply of a washing liquid. On the other hand, where the compressed air and the washing liquid are simultaneously supplied into the regenerating column, only the supply of the compressed air should be interrupted after a predetermined period of time. The successive or simultaneous supply of the compressed air and the washing liquid may be made into the regenerating column from the bottom. Alternatively, while the supply of the washing liquid is charged into the regenerating column from bottom, the supply of the compressed air may be charged into a connecting piping extending between the bottom of the liquid treating column and the top of the regenerating column.

After completion of the regeneration of the purifying particles within the regenerating column, the regenerated purifying material is transported back into the liquid treating column, entering thereinto from the top of the liquid treating column. The supply of the regenerated purifying material back into the liquid treating column may be either intermittent or continuous and so may be the transfer of the soiled purifying material from the liquid treating column into the regenerating column.

Where the purifying material employed is a filtering material, there may be a possibility that the bed of filtering material will not move downwards uniformly upon discharge of some of the filtering material which has been soiled in contact with the liquid being purified. This is because the physical properties of the filtering material tend to vary when the suspended solids contained in the liquid to be purified are trapped by the filtering material. When this possibility is desired to be substantially eliminated, the liquid treating column according to the present invention may include a barrier positioned within the liquid treating column and embedded in the purifying bed at a position substantially intermediately of the height of the purifying bed for regulating a downward descending motion of the purifying bed during the discharge of some of the soiled purifying material from the bottom of the liquid treating column towards the regenerating column.

The liquid treating column employed in the present invention may have an auxiliary separator tank mounted on the top of the liquid treating column for achieving separation of some of the suspended solids which have remained unremoved during the washing operation in the regenerating column and which are contained in the regenerated purifying material fed back towards the liquid treating column from the bottom of the regenerating column.

With the apparatus of the present invention, the operation of the apparatus need not be interrupted only for the purpose of washing the purifying material which has been used to purify a liquid to be purifed. Moreover, the apparatus of the present invention can satisfactorily and effectively operate with an increased concentration of the suspended solids in the liquid to be purified and also with variation in rate of supply of the liquid to be purified. This can be accomplished, for example, by adequately adjusting the amount of the purifying material to be replenished.

Where the suspended solids contained in the liquid to be purified are of a nature that tends to form mudballs, formation of such mudballs can advantageously be avoided by shortening the time interval between the succeeding discharge of the soiled purifying particles from the liquid treating column into the regenerating column.

The liquid treating column and the regenerating column may be arranged in side-by-side relation to each other. Alternatively, they may be arranged in a vertically axially aligned relation to each other. In terms of the space for installation of the apparatus, the vertically axially aligned arrangement is preferred since a relatively small space is required with a minimum number of accessory equipments.

Furthermore, in the apparatus of the present invention, even the suspended solids of 2 to 5 microns in particle size can satisfactorily and effectively be removed from the liquid to be purified in contrast to the conventional liquid treating column which generally deals with suspended solids of 10 to 20 microns in particle size. The bed of the purifying material within the liquid treating column of the present invention can have a substantially constant and uniform purifying capacity since some of the purifying material which is soiled by the suspended solids can be intermittently or continuously replenished.

So far as the regenerating column of the present invention is involved, since the soiled purifying particles are, during washing thereof, fluidized by the compressed air and the washing liquid, a relatively small amount of the washing liquid, for example, about tenfold of the amount of the soiled purifying material to be washed thereby, may be sufficient and satisfactory.

The apparatus of the present invention including the liquid treating column and the regenerating column may be constructed of a closed countercurrent liquid-soiled contacting system.

BRIEF DESCRIPTION OF THE DRAWING

These and other objects and features of the present invention will become apparent from the following description taken in conjunction with preferred embodiments thereof with reference to the accompanying drawings, in which.

DETAILED DESCRIPTION OF THE EMBODIMENTS

Figures 1, 2:
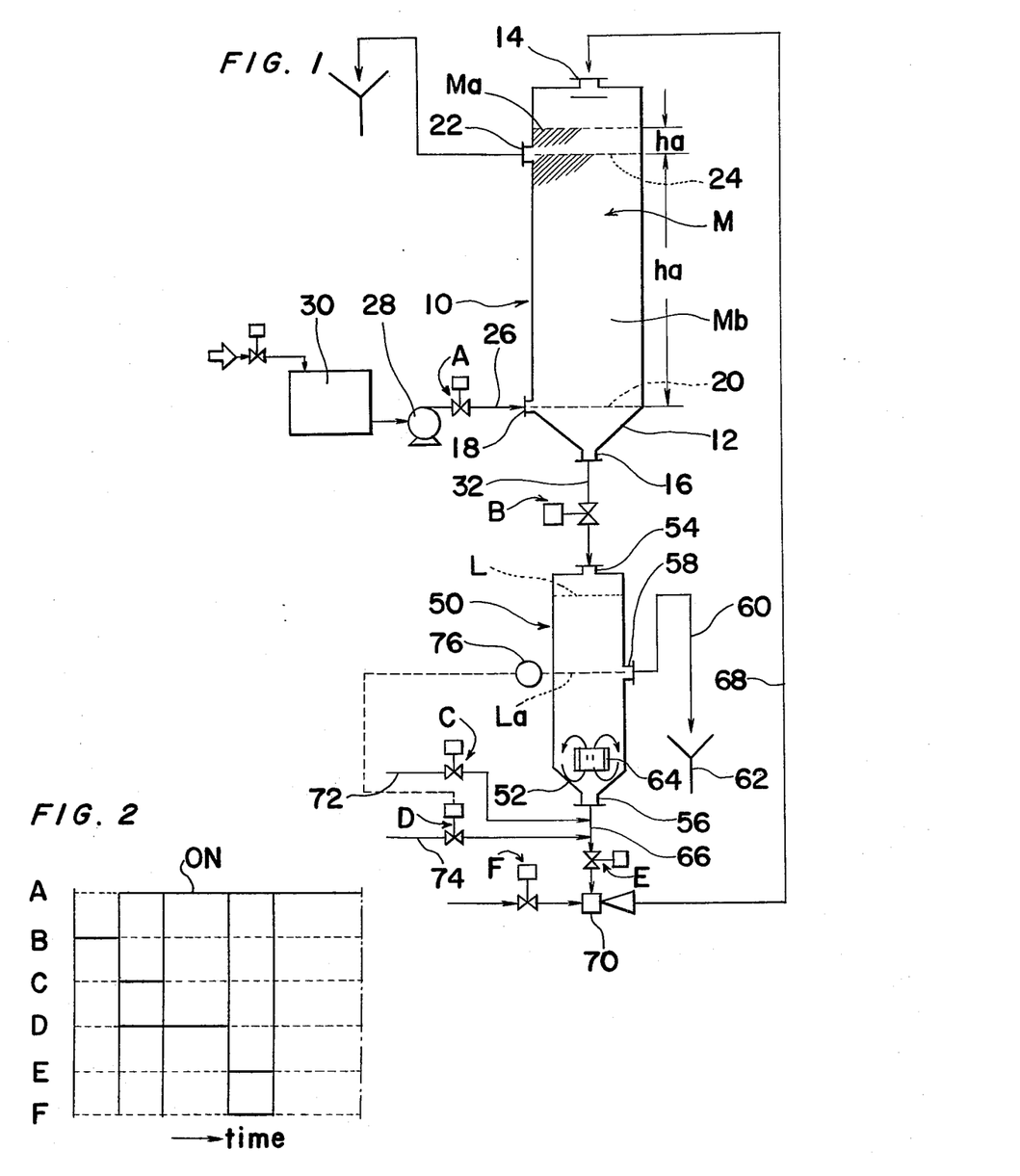
FIG. 1 is a schematic longitudinal sectional view of an apparatus embodying the present invention.
FIG. 2 is a chart showing timed relations of various valve assemblies employed in the apparatus shown in FIG. 1.

Referring to FIG. 1, an apparatus embodying the present invention comprises a liquid treating column, generally indicated by 10, and a regenerating column generally indicated by 50. The liquid treating column 10 is in the form of a substantially elongated vessel having a cross-sectional representation of any suitable, e.g., circular or square, shape and having its bottom downwardly tapered at 12 in a manner which substantially complements the cross-sectional configuration of the body of the vessel. The liquid treating column 10 has a supply port 14, defined at the top of the column 10 and through which a mass of purifying material, as will be described later, is continuously or intermittently supplied into the interior of the column 10, and a transfer port 16 defined at an apex portion of the downwardly tapered area 12 of the column and through which some of the purifying material within the column 10 is discharged into the regenerating column 50.

The liquid treating column 10 also has a liquid inlet 18, defined therein at a location adjacent and above the transfer port 16 and communicated to the interior of the column 10 through a liquid distributor 20, and a liquid outlet 22 defined therein at a location adjacent the top of the column 10 and above the liquid inlet 18 and communicated to the interior of the column 10 through a liquid collector 24 which may be in the form of a screened pipe.

Within the interior of the liquid treating column 10, there is a bed of purifying material M which is constituted by a mass of purifying particles. (The amount of the purifying material of the bed is described later.)

In the construction so far described, a liquid to be purified, which has been supplied to the liquid inlet 18 through a supply piping 26 by means of a pump 28 from a source thereof, for example, a liquid reservoir 30, can be uniformly distributed by the liquid distributor 20 so as to flow upward through the bed of purifying material M and, then, after having been substantially purified, discharged out of the liquid treating column 10 through the liquid outlet 22 by way of the liquid collector 24.

The purifying material forming the bed employed in the present invention may be any filtering material, such as sand, anthracite, glass or porcelain, and an adsorbent material such as activated carbon, activated alumina, silica gel, synthetic zeolite or synthetic resin. As will be discussed in more details later, the purifying bed within the liquid treating column 10 is substantially divided into upper (or settling) and lower layers, respectively, designated by Ma and Mb, which are situated one above the other on respective sides of the liquid collector 24. The upper or settling layer Ma positioned above the liquid collector 24 serves to suppress the lower layer Mb of the bed, thereby avoiding any possible fluidization and/or expansion of the purifying particles which may otherwise take place when the liquid flows upward through the bed from the distributor 20 toward the liquid collector 24. This is particularly true where the purifying particles forming the bed have a relatively small specific gravity. According to a series of experiments conducted by the inventors using various types of purifying material, it has been found that the minimum height of the settling layer Ma is preferably selected so that the ratio of the total height of the bed relative to the minimum height of the settling layer Ma, multiplied by 100, that is, $[ha/(ha+hb)\times 100]$, where ha and hb respectively represent the minimum height of the settling layer Ma and the height of the lower layer Mb as shown, is within a range of a few percents to some ten percents, preferably a few percents.

Where the purifying particles forming the bed have a relatively great specific gravity, however, the settling layer Ma may not always be necessary since the lower layer Mb can suppress itself thereby avoiding any possible fluidization and/or expansion of the purifying particles forming the lower layer Mb.

In any event, as is well known to those skilled in the art, with increased duration of operation, the purifying material M is heavily permeated with suspended solids especially in the region of entry of the liquid being purified, particularly adjacent and above the liquid distributor 20. Some of the purifying material so soiled by the suspended solids is periodically discharged toward the regenerating column 50 through the transfer port 16 by way of a connecting piping 32. For this purpose, a shutoff valve assembly B on the connecting piping 32 is opened for a predetermined period of time at a predetermined time intervals to allow some of the purifying material to transfer toward the regenerating column 50. It is to be noted that the shut-off valve assembly B may be a solenoid-operated type or a pneumatical-or hydraulic-operated type so that the predetermined period of time in which the valve assembly B is opened and the interval of selective opening and closing of the valve assembly B can be controlled by a predetermined program set in a timer of any known construction.

It is to be noted that, during the discharge of the soiled purifying material from the transfer port 16 toward the regenerating column 50, the supply of the liquid from the pump 28 towards the liquid inlet 18 through the supply piping 26 may be interrupted or reduced. This can be accomplished by closing or regulating another shut-off valve assembly A in the supply piping 26.

The regenerating column 50 is in the form of a substantially elongated vessel having a cross-sectional representation of any suitable, e.g., circular or square, shape and having its bottom downwardly tapered at 52 in a manner which substantially complements the cross-sectional configuration of the body of the regenerating vessel. The regenerating column 50 has a receiving port 54, defined at the top of the column 50 and communicated to the transfer port 16 of the liquid treating column 10 through the connecting piping 32, and a discharge port 56 defined at an apex portion of the downwardly tapered area 52 of the column 50 and through which the purifying material, after having been substantially completely regenerated, can be discharged in the form of a slurry to the outside of the regenerating column 50 and then fed back to the liquid treating column 10 in a manner as will be described later.

The regenerating column 50 also has a liquid outlet 58 defined therein at a location substantially intermediate of the height of the column 50 and communicated to a siphon piping 50 of substantially inverted U-shape having one end connected to the liquid outlet 58 and the other end spaced from and aligned with a discharge duct 62. A portion of the siphon piping 60, which corresponds to the bottom of the figure "U" of the shape of the siphon piping 60, is positioned below the top level of the column 50 and above the liquid outlet 58 so that the uppermost surface level of the washing liquid, which is introduced into the interior of the column 50 in a manner as will be described later, can be defined at a position L spaced a predetermined distance from the top of the column 50. In other words, the piping 60 is designed so that, when the uppermost surface level of the washing liquid introduced into the regenerating column 50 attains the level L substantially aligned with or slightly higher than the position of that portion of the piping 60 which corresponds to the bottom of the figure "U" of the shape of the piping 60, some of the washing liquid within the regenerating column 50 can, after having been used to wash the soiled purifying material in a manner as will be described later, be automatically discharged to the outside of the column 50 through the liquid outlet 58 by way of the piping 60 by the siphon phenomenon.

It is to be noted that, instead of the employment of the siphon piping 60 and its associated parts, the regenerating column 50 may be in the form of an open-topped vessel so that the used washing liquid can be discharged from the top opening of the regenerating column by the overflow action.

Supported in position within the regenerating column 50 at a lower region adjacent the discharge port 56 is a rectifier 64 which is, in the instance as shown, in the form of a ring member having a plurality of radially outwardly extending arms (not shown) each having one end integral with said ring member and the other, free, end rigidly secured to the wall forming the regenerating column 50. The ring member 64 may have a circular, square or polygonal shape and serves to enhance fluidization of the soiled purifying particles when compressed air is supplied into the regenerating column 50 from the bottom as will be described later to fluidize the soiled purifying particles within the column 50. Specifically, since the rectifier 64 is positioned within the column 50 in alignment with the discharge port 56, the compressed air, when supplied into the column 50 through the discharge port 56, flows upwards through the central hollow of the rectifier 64, causes the soiled purifying particles within the central hollow of the rectifier 64 to move upwards, and then, after having moved downwards externally of the rectifier 64, recirculates back to the central hollow of the rectifier 64 as shown by the arrows. In this way, with the employment of the rectifier 64, the soiled purifying particles can positively be fluidized to facilitate separation of the suspended solids from the soiled purifying particles transferred from the liquid treating column 10 onto the regenerating column 50.

The regenerating column 50 of the construction as hereinabove described may be positioned either laterally of the liquid treating column 10 in a side-by-side relationship or may be immediately beneath the liquid treating column 10 in an axially aligned relationship. When the column 50 is positioned laterally of the column 10, it is necessary to install in the connecting piping 32 any suitable transport unit which may be a pump, an ejector or a bucket conveyance for transporting the soiled purifying material discharged from the transfer port 16 of the column 10 toward the receiving port 54 of the column 50. On the other hand, when the column 50 is positioned right below the column 10 such as shown, no such transport unit is required and the soiled purifying material from the transfer port 16 can fall downward by gravity into the receiving port 54 of the column 50 in the form of a slurry. In terms of simplification of the apparatus as a whole with a consequent reduction in cost, the regenerating column 50 is preferably positioned right below the liquid treating column 10 such as shown.

The discharge port 56 of the regenerating column 50 is communicated to the supply port 14 by a downwardly extending exhaust piping 66 having one end in communication with the discharge port 56, and a feedback conduit 68 having one end coupled to the supply port 14 of the liquid treating column 10. The other ends of the respective piping 66 and the conduit 68 are connected to each other by an ejector 70 of a type having a suction port communicated to the exhaust piping 66 so as to draw the regenerated purifying material from the discharge port 56 during opening of a shut-off valve assembly E; an inlet port communicated to a source of transport liquid through a shut-off valve assembly F; and a discharge port communicated to the feedback conduit 68. This ejector 70 is, when as the liquid treating and regenerating columns 10 and 50 are positioned in axially vertically aligned relation to each other such as shown, also positioned right below the regenerating column 50 with the discharge port 56 substantially aligned with the suction port of the ejector 70.

A portion of the exhaust piping 66 between the discharge port 56 and the shut-off valve assembly E is communicated to a source of compressed air (not shown) and a source of washing liquid (not shown) by means of respective supply pipings 72 and 74, each having a flow regulator C or D disposed therein.

In the construction so far described, after the soiled purifying material has been transferred from the discharge port 16 into the regenerating column 50 through the receiving port 54 during the opening of the shut-off valve assembly B, the compressed air and the washing liquid are successively or simultaneously supplied into the regenerating column from the bottom of the column 50, that is, through the discharge port 56, to fluidize and wash the soiled purifying particles, accommodated within a lower region of the regenerating column 50, so that the suspended solids can be separated from the purifying particles being fluidized. In the instance as shown, as clearly understood fom the chart shown in FIG. 2, the compressed air and the washing liquid are simultaneously supplied into the regenerating column 50 for a predetermined period of time during the initial stage of the washing operation.

After the predetermined period of time during which the compressed air and the washing liquid are simultaneously supplied into the regenerating column 50 in the manner as hereinabove described, the supply of the compressed air into the regenerating column 50 is interrupted while the supply of the washing liquid is still continued. Subsequent to the interruption of supply of the compressed air into the regenerating column 50 through the discharge port 56, the washing liquid is supplied into the regenerating column 50 through the discharge port 56 at such a rate as to cause the purifying particles within the regenerating column 50 to fluidize. At this time, the uppermost surface of the washing liquid supplied into the regenerating column 50 elevates in a piston-flow manner and, therefore, the washing liquid containing a relatively high concentration of the suspended solids separated from the purifying particles can substantially completely be substituted by a fresh washing liquid subsequently supplied. As the uppermost surface of the washing liquid within the regenerating column 50 further elevates, the separated suspended solids are forced to move toward an upper region of the regenerating column 50 and are then discharged to the outside of the column 50 through the siphon piping 60 together with the used washing liquid.

It is to be noted that, since the soiled purifying material transferred from the liquid treating column 10 onto the regenerating column 50 is in the form of a slurry containing a high concentration of soiled purifying particles, the simultaneous supply of the compressed air and the washing liquid is preferred during the initial stage of the washing operation to facilitate separation of the suspended solids from the purifying particles being washed with the concentration of the slurry lowered. Where the slurry transferred from the liquid treating column 10 onto the regenerating column 50 contains a low concentration of soiled purifying particles, only the supply of the compressed air may be sufficient, followed by the supply of the washing liquid.

After the washing operation effected in the manner as hereinbefore described has been completed, at which time the flow regulator D is closed in a manner as will be described later, the shut-off valve assembly E is opened to allow the regenerated purifying material to be drawn through the discharge port 56 towards the ejector 70 past the shutoff valve assembly E. The regenerated purifying material is, after having been admixed with the transport liquid supplied through the shut-off valve assembly F, transported in the form of a slurry toward the supply port 14 of the liquid treating column 10 by way of the feed-back conduit 68.

In practice, for controlling the flow regulator D which is in the form of a solenoid operated valve assembly, the regenerating column 50 is provided with a timer-controlled level sensor 76 designed to generate an electric deenergizing signal only when the uppermost surface of the washing liquid within the regenerating column 50 falls below a predetermined level La, which is aligned with the liquid outlet 58, subsequent to expiration of a predetermined period of time set in a timer for controlling the level sensor 76. In other words, during the predetermined period of time set in a timer for controlling the level sensor 76, the level sensor 76 is held in inoperative position and, therefore, will not generate the deenergizing signal. However, it generates the deenergizing signal subsequent to the expiration of the predetermined period of time set in the timer for controlling the level sensor 76.

With this deenergizing signal from the level sensor 76, the flow regulator D can be closed. In other words, the flow regulator D is closed in response to the deenergizing signal fed from the level sensor 76 subsequent to the expiration of the predetermined period of time set in the timer for controlling the lever sensor 76.

The predetermined period of time set in the timer for controlling the lever sensor 76, that is, the predetermined period of time during which the lever sensor 76 is held in inoperative position, may be selected so that discharge of the used washing liquid by way of the siphon piping 60 takes place once or several times during the continued supply of the washing liquid into the regenerating column 50 through the discharge port 56.

More specifically, assuming that the predetermined period of time during which the level sensor 76 is held in inoperative position is selected so that the discharge of the used washing liquid by way of the siphon piping 60 can take place several times during such period, this is possible by the following reason. Because of this siphon piping 60 through which the used washing liquid containing the separated suspended solids is discharged by the siphon phenomenon incident to elevation of the uppermost surface level of the washing liquid within the regenerating column 50 above the L, the uppermost surface level of the washing liquid within the column 50 falls downward toward the level La aligned with the liquid outlet 58 upon discharge of the used washing liquid by way of the siphon piping 60. Then, after having reached the level La, the washing liquid again elevates toward the level L during the continued supply of the washing liquid into the regenerating column 50 through the discharge port 56. In other words, each time the uppermost surface of the washing liquid within the regenerating column 50 attains the level L during the predetermined period of time set in the timer for controlling the level sensor 76, the uppermost surface of the washing liquid suddenly falls downward toward the level La with a portion of the washing liquid above the level La being discharged through the siphon piping 60, even though the washing liquid continues to be supplied into the regenerating column 50 through the discharge port 56. For this purpose, the siphon piping 60 is designed so that the rate of flow of the used washing liquid to be discharged therethrough is higher than the rate of supply of the fresh washing liquid into the column 50 through the discharge port 56.

From the foregoing, it is clear that, during the continued supply of the washing liquid into the column 50 through the discharge port 56 which takes place during the predetermined period of time set in the timer for controlling the level sensor 76, a portion of the used washing liquid above the level La is periodically discharged to the outside of the column 50 by the siphon phenomenon. Therefore, the suspended solids separated from the soiled purifying particles into the washing liquid within the regenerating column 50 have no time to sink toward the bottom of the regenerating column 50 and are consequently removed from the column 50 substantially completely together with the used washing liquid.

It is to be noted that the shut-off valve assembly A, if employed in the form of a solenoid operated valve, and the shut-off valve assembly B, if employed in the form of a solenoid operated valve, may be electrically operatively associated in such a manner that, when the valve assembly B is opened, the valve assembly A is closed, and vice versa, as can readily be seen from the chart of FIG. 2. It is also to be noted that the shut-off valve assemblies E and F may be electrically or mechanically operatively associated with each other in such a manner that, when the valve assembly E is opened, the valve assembly F is opened simultaneously therewith. Furthermore, irrespective of the operative association of the valve assembly E with the valve assembly F, the valve assembly E may be operatively associated with either the timer-controlled level sensor 76 or the flow regulator D in such a manner that, when the flow regulator D is closed, the valve assembly E can be opened. However, it is preferred that the valve assemblies D, E and F be simultaneously or sequentially controlled by the output signal from the level sensor 76 which is generated in response to the fall of the uppermost surface of the washing liquid within the column 50 below the level La which takes place subsequent to expiration of the predetermined period of time set in the timer for controlling the level sensor 76.

The present invention will now be described by way of illustrative examples so far as the embodiment shown in FIGS. 1 and 2 is involved. These examples are not intended to limit the scope of the present invention.

EXAMPLE I

An apparatus having a construction shown in FIG. 1 was used. The liquid treating column was a cylindrical vessel having 365 mm. in internal diameter and the regenerating column was a cylindrical vessel, 100 mm. in internal diameter and 2,000 mm. in height. A substantially ring-shaped rectifier was positioned inside the regenerating column adjacent the bottom thereof and a siphon piping was provided. An industrial waste water containing 43 p.p.m. of high viscosity suspended solids of 2 to 30 microns in particle size was passed upwardly through a bed of spheroidal adsorbent particles of 1.4 mm. in average particle size within the liquid treating column so as to flow at an upflow velocity of 20 m/h while the adsorbent material forming the bed was replenished by supplying a regenerated adsorbent material from the regenerating column onto the top of the bed within the liquid treating column in the form of a slurry at a rate of 3.0 liters per 1.4 m³ of the industrial waste water (substantially at intervals of 40 minutes). Simultaneously therewith, the soiled adsorbent material from the bottom of the bed within the liquid treating column was discharged into the regenerating column at the same rate that the regenerated adsorbent material was supplied into the liquid treating column. The transfer of the soiled adsorbent material from the liquid treating column into the regenerating column was effected by the utilization of gravity and in the soiled adsorbent material was in the form of a slurry. The adsorbent material forming the bed within the liquid treating column was a mass of spheroidal activated carbon manufactured and sold under a trade name "Takeda X-7000 Activated Carbon" by Takeda Yakuhin Kogyo Kabushiki Kaisha, also known as Takeda Chemical Industries, Ltd., of Japan.

The soiled adsorbent material, 3.0 liters in slurry form, which had been transferred, was washed in the regenerating column in the following manner. Compressed air was first passed upwardly through a bed of the soiled adsorbent material within the regenerating column at a rate of 5 liters per minute (that is, so as to flow at an upflow velocity of 38.2 m/h) for 2 minutes to cause the soiled adsorbent particles to fluidize through the rectifier in the manner as shown by the arrows in FIG. 1 and, then, washing water was passed upwardly through the soiled adsorbent bed at a rate of 5 liters per minute to continue washing of the soiled adsorbent particles within the regenerating column. The washing water containing the suspended solids separated from the adsorbent particles within the regenerating column was substantially completely replaced by the continuously supplied fresh washing water. When the uppermost surface of the washing water attained the predetermined level (which is shown by L in FIG. 1), 10 liters of the washing water was discharged to the outside of the regenerating column through the siphon piping by the siphon phenomenon. After the discharge of the used washing water by the siphon phenomenon by way of the siphon piping was effected two times and subsequent to the detection of the uppermost surface level of the washing water within the regenerating column falling below the level (which is shown by La in FIG. 1), the supply of washing water into the regenerating column was interrupted and the adsorbent material within the regenerating column was allowed to fall downward toward an ejector under the influence of gravity force which was in turn transported onto the top of the adsorbent bed within the liquid treating column as the regenerated adsorbent material. The foregoing sequence of operation was controlled by the use of a timer according to the method of the present invention and the apparatus was operated continuously for three weeks.

The suspended solids were removed from the industrial waste water to 3.4 p.p.m. on an average for each week and the removal rate was 92.1%.

The soiled adsorbent material discharged from the liquid treating column onto the regenerating column had contained the suspended solids separated from the industrial waste water in an amount of 18.4 gr. per liter of the slurry. However, after regeneration of the soiled adsorbent material, it was found that the regenerated adsorbent material contained the suspended solids in an amount of 0.18 gr. per liter of the slurry and the removal rate during the washing was 99%. The washing water discharged through the siphon piping contained 2,732 p.p.m. of the removed suspended solids and, therefore, it is clear that the concentration of the suspended solids in the purified industrial waste water was 1/73 of that of the untreated industrial waste water.

EXAMPLE II

By using an apparatus of the same construction as employed in Example I, industrial waste water containing 35 p.p.m. of high viscosity suspended solids of 2 to 30 microns in particle size was passed upwardly through a bed of filtering sands, 0.9 mm. in average particle size, 1 meter in height within the liquid treating column. The waste water flowed at an upflow velocity of 20 m/h while the filtering material forming the bed was replenished by supplying a regenerated filtering sands from the regenerating column onto the top of the bed within the liquid treating column in the form of a slurry at a rate of 3.0 liters per 2 $m^3$ of the industrial waste water (substantially at intervals of 60 minutes). Simultaneously, the the soiled filtering material from the bottom of the bed within the liquid treating column was discharged into the regenerating column at the same rate as the supply of the regenerated filtering material into the liquid treating column. The transfer of the soiled filtering material from the liquid treating column into the regenerating column was effected by the utilization of a gravity and was in the form of a slurry.

The soiled filtering material, 3.0 liters in an amount in the form of a slurry, which had been so transferred, was washed in the regenerating column in the following manner. Compressed air was first passed upwardly through a bed of the soiled filtering sands within the regenerating column at a rate of 15 liters per minutes (that is, so as to flow at an upflow velocity of 114.6 m/h), simultaneously with the washing water supplied at a rate of 15 liters per minute. The simultaneous supply of the compressed air and the washing water was effected for 30 seconds to fluidize the soiled filtering sands through the rectifier in the manner as shown by the arrows in FIG. 1. Thereafter, the supply of the compressed air was interrupted, and the washing water was continued to be supplied. When the uppermost surface of the washing water within the regenerating column attained the predetermined level (which is shown by L in FIG. 1), 10 liters of the washing water containing the separated suspended solids was discharged to the outside of the regenerating column through the siphon piping by the siphon phenomenon and, when the uppermost surface level of the washing water fell below the level (which is shown by La in FIG. 1), the supply of the washing water was interrupted and the filtering material within the regenerating column was allowed to fall downward toward an ejector under the influence of gravity. The filtering material was then transported onto the top of the filtering bed within the liquid treating column as the regenerated filtering material. The foregoing sequence of operation was controlled by the use of a timer according to the method of the present invention and the apparatus was operated continuously for two weeks.

The suspended solids were removed from the industrial waste water to 2.0 p.p.m. on an average for each week and the removal rate was 94.3%.

The soiled filtering material discharged from the liquid treating column into the regenerating column contained the suspended solids, separated from the industrial waste water, in an amount of 220 gr. per liter of the slurry of the soiled filtering material. However, after regeneration of the soiled filtering material, it was found that the regenerated filtering material contained the suspended solids in an amount of 0.2 gr. per liter of the slurry; the removal rate during the washing was 99%. The washing water discharged through the siphon piping contained 6,540 p.p.m. of the removed suspended solids and, therefore, it was clear that the concentration of the suspended solids in the purified industrial waste water was 1/200 of that of the untreated industrial waste water.

In the foregoing description, although the transfer of the soiled purifying material from the liquid treating column into the regenerating column has been described as effected intermittently, it may be effected continuously or substantially continuously. Where intermittent transfer is desired, the shut-off valve assembly A is preferably closed during the opening of the shut-off valve assembly B. In addition, although it has been described that the level sensor 76 generates the deenergizing signal in response to the fall of the uppermost surface of the washing liquid within the regenerating column below the level La, the level sensor 76 may be of a type which can generate the deenergizing signal in response to elevation of the uppermost surface level of the washing liquid within the regenerating column over the level La subsequent to expiration of the predetermined period of time set in the timer for controlling the level sensor.

Furthermore, if desired, one or more relay or temporary storage tanks may be disposed along the connecting piping 32, the exhaust piping 66 and/or the feedback conduit 68. Moreover, the valve assembly E described as disposed in the exhaust piping 66 may be omitted and, where this valve assembly E is omitted, the regenerated purifying material will be fed back to the top of the liquid treating column through the conduit 68 only when the valve assembly F is opened to allow the transport liquid to pass through the ejector 70 into the conduit 68.

Figures 3, 4:
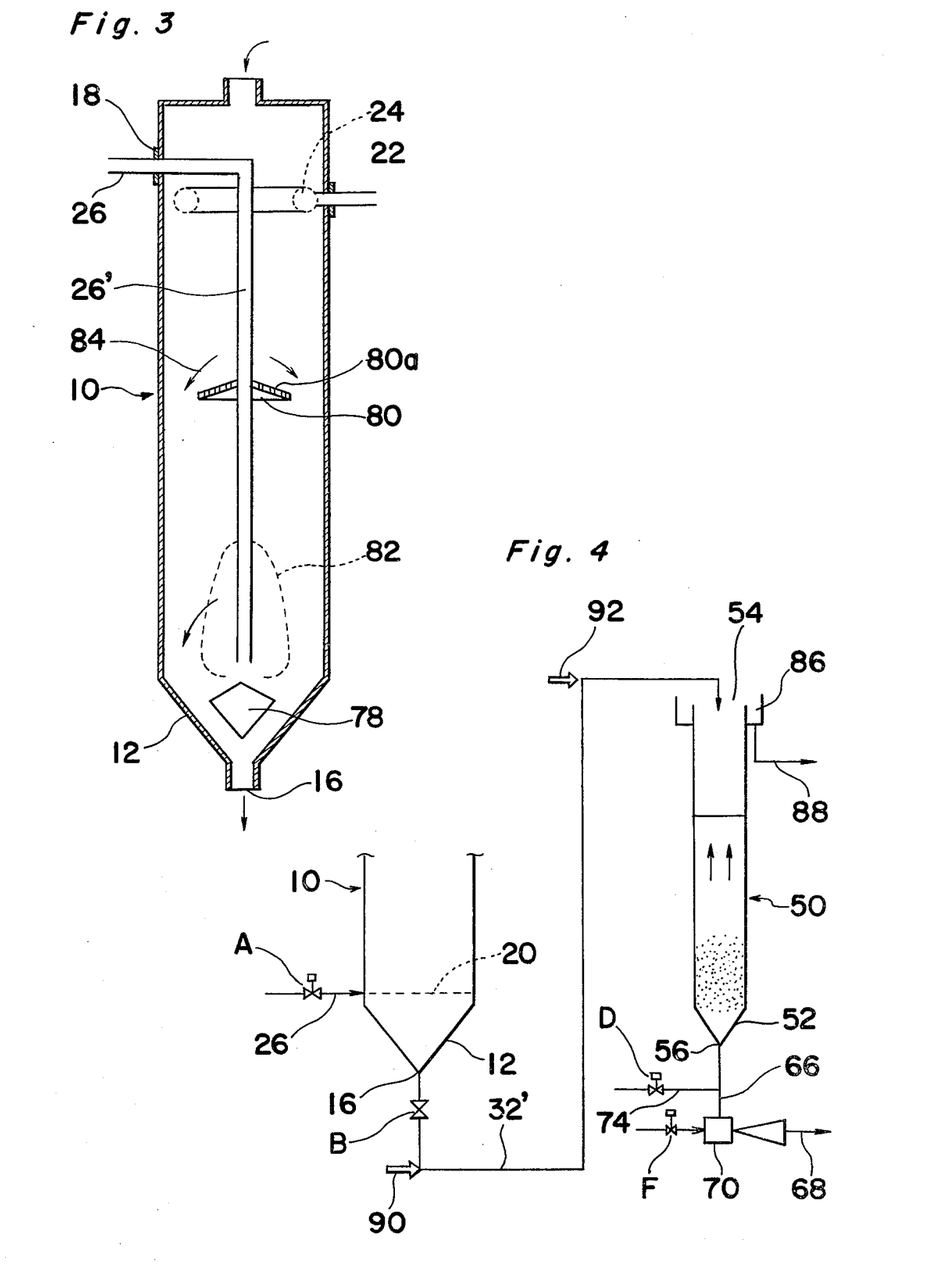
FIG. 3 is a schematic longitudinal sectional view of a modified form of a liquid treating column.
FIG. 4 is a schematic diagram showing the liquid treating column and a regenerating column arranged in side-by-side relationship to each other.

Referring now to FIG. 3, where the purifying material within the liquid treating column is employed in the form of a filtering material, the physical properties of the filtering material tend to be readily changed as the suspended solids contained in the liquid to be purified are caught by the filtering particles during the use of the apparatus for a prolonged period of time. Therefore, there is the possibility that some of the filtering material in the region of entry of the liquid into the liquid treating column 10 will not move downward uniformly during the discharge through the transfer port 16. This possibility can be substantially eliminated by constructing the column 10 as shown in FIG. 3.

As best shown in FIG. 3, the column 10 accommodating therein the bed of filtering material has a first structural element 78 positioned within the liquid treating column 10 adjacent the bottom thereof and in alignment with the transfer port 16. This first structural element 78 is employed in the form of a so-called rectifier having a conical shape, or an inverted conical shape, or which is two cones whose bases are butted together and of a construction which will not pass one or both of the liquid and the filtering particles therethrough. So far as illustrated, the first structural element 78 is in the form of the rectifier having a shape of two cones whose bases are butted together as shown.

In addition to the employment of the first structural element 78, the liquid supply port 18, which has been described as formed in the liquid treating column 10 at a position adjacent the bottom thereof in the embodiment of FIG. 1 is formed at an upper portion of the column 10, particularly, at a position substantially intermediately between the middle of the liquid treating column 10 and the top of the column 10. The liquid supply piping 26 extends into the liquid treating column 10 through the liquid supply port 18 in a watertight manner and is bent so as to further extend as shown by 26' downward in alignment with the longitudinal axis of the liquid treating column 10 and terminates at a position spaced a predetermined distance from one of the opposed apexes of the first structural element 78 which faces upward. A portion 26' of the liquid supply piping 26 carries a second structural element 80 rigidly mounted thereon. This second structural element 80 may be a flat plate or a substantially bevel-shaped plate such as shown. Preferably, the second structural element 80 has a plurality of perforations 80a of such a size that will restrict the passage of the filtering particles therethrough. However, if desired, the second structural element may, as is the case of the first structural element 78, be of a construction which will not allow passage therethrough of both the liquid and the filtering particles. Where the second structural element 80 is employed in the form of the substantially bevel-shaped plate, it should be mounted on the portion 26' of the piping 26 in such a manner that an apex portion of the bevel shaped structure faces upward, as shown.

It is to be noted that the number of the second structural elements 80 may not be always limited to one such as shown. There may be a plurality. Where a plurality of second structural elements are employed, they can be mounted on the piping portion 26' in spaced relation to each other, the number being selected in consideration of the height of the liquid treating column 10, the diameter of the liquid treating column 10 and/or the properties of either or both the filtering material and the liquid to be purified.

In the construction of the liquid treating column as shown in FIG. 3, the liquid to be purified, which has been supplied to the piping portion 26' through the liquid supply piping 26, emerges downward toward the upwardly facing apex portion of the first structural element 78 and is diffused in a direction radially outwardly and upwardly with respect to the lower open end of the piping portion 26' in a manner substantially shown by the broken line 82. As is well known to those skilled in the art, some of the filtering material situated within the liquid treating column in the region of entry of the liquid into the liquid treating column tends to be readily soiled by the suspended solids contained in the liquid because of the fact that a portion of the filtering bed in the region of entry of the liquid is mainly used for filtration of the liquid to be purified. In the event that no replenishment of the soiled filtering material is carried out, the soiled zone of the filtering bed will be enlarged gradually upwardly. Accordingly, that portion of the filtering bed in the region of entry of the liquid is continuously or intermittently discharged through the transfer port 16 onto the regenerating column 50 before it becomes difficult for the filtering bed to move downward or to descend due to a high concentration of the suspended solids separated from the liquid and consequently stuck to the filtering particles.

As that portion of the filtering bed in the region of entry of the liquid into the liquid treating column 10 through the lower open end of the piping portion 26' is discharged in the manner as hereinbefore described in connection with the liquid treating column of the construction shown in FIG. 1, the filtering bed as a whole is downwardly moved and, at this time, some of the filtering particles situated above the second structural element 80 slide down the second structural element 80 in a manner as shown by the arrows 84. Similarly, the bottom of the filtering bed within the liquid treating column 10 is, during its downward movement incident to the discharge of the some of soiled filtering particles, also forced to move in a radially downward direction and then to flow toward the transfer port 16 through an annular clearance defined between the first structural element 78 and the wall forming the downwardly tapered area 12 of the liquid treating column 10. Therefore, it is clear that the soiled zone of the filtering bed within the liquid treating column 10 and in the region of entry of the liquid can assuredly be thrown into disorder to facilitate the subsequent discharge thereof through the transfer port 16.

In any event, since the first structural element 78 can satisfactorily and effectively serve to change the mode of downward flow of the soiled filtering particles toward the transfer port 16 without permitting the soiled filtering particles to be coagulated by the action of the viscosity of suspended solids sticking to the filtering particles, the employment of the second structural element 80 may not always be always essential.

FIG. 4 diagrammatically illustrates the columns 10 and 50 arranged in side-by-side relation to each other with a connecting piping 32' extending from the transfer port 16 to the top of the regenerating column 50. It is to be noted that the regenerating column 50 far shown in FIG. 4 is of a type having an overflow trough 86 rigidly secured to or integrally formed with and surrounding the top edge of the open-topped vessel forming the column 50. The overflow trough is in turn communicated to the outside by means of a duct 88. Of course the regenerating column may also be of the construction shown in FIG. 1.

For transporting a slurry of soiled purifying material discharged from the transfer port 16 into the connecting piping 32' during the opening of the valve assembly B, a transport liquid under pressure is supplied into the connecting piping 32' at 90 immediately below the valve assembly B from a suitable source of the transport liquid.

From the foregoing, it will readily be seen that, during the supply of the transport liquid into the connecting piping 32', the soiled purifying particles discharged through the transfer port 16 into the connecting piping 32' via the valve assembly B are transported in the form of a slurry toward the regenerating column 50. During this transportation of the slurry, the soiled purifying particles are substantially agitated by the flow of the transport liquid and, therefore, generate friction between themselves and between the inner wall of the connecting piping 32' so the suspended solids sticking to the purifying particles are effectively separated from the purifying particles before the soiled purifying material is supplied into the regenerating column 50. The extent to which the suspended solids are separated from the purifying particles during the transportation of the slurry through the connecting piping 32' is somewhat limited; however, a substantially complete separation thereof from the purifying particles is subsequently effected within the regenerating column 50 as will be described later.

When the washing liquid is introduced into the regenerating column 50 in the manner as hereinbefore described with reference to FIG. 1 to fluidize the soiled purifying particles within the regenerating column 50, some of the suspended solids which are not yet separated from the purifying particles during the transportation thereof through the connecting piping 32' are forced to separate from the purifying particles and are subsequently discharged to the outside through the overflow trough 86 by means of the duct 88 together with the suspended solids which have separated from the purifying particles during the transportation thereof through the connecting piping 32'. This is possible because the washing liquid supplied into the regenerating column 50 from bottom, that is, through the discharge port 56, flows upward through the bed of the soiled purifying material within the regenerating column 50 in a piston-flow manner as hereinbefore described with reference to FIG. 1.

It is to be noted that the amount of the transport liquid required varies depending upon the length and height of connecting piping 32' and/or the type of purifying material used. However, it may usually be small if the columns 10 and 50 arranged in a close side-by-side relationship To facilitate more separation of the suspended solids from the purifying particles being transported through the connecting piping 32', compressed air may be supplied into the connecting piping 32' at another junction as shown by 92. This compressed air not only enhances the agitation of the soiled purifying particles being transported through the connecting piping 32', but also participates in the transportation of the slurry containing the soiled purifying particles. Therefore, the amount of the transport liquid required to transport the soiled purifying material through the connecting piping 32' may be smaller than that required if the soiled purifying material is transported through the piping 32' only by the aid of the transport liquid. Where the combination of the transport liquid and the compressed air is employed to transport the slurry containing the soiled purifying material through the connecting piping 32' in the manner as hereinabove described, the compressed air is discharged to the atmosphere as it emerges outward from the open end of the connecting piping 32' situated above the top of the regenerating column 50 while the slurry falls downward into the interior of the regenerating column 50.

As hereinbefore described, since some of the suspended solids carried by the soiled purifying particles are separated from the purifying particles during the transportation thereof through the connecting piping 32', the amount of the washing liquid to be supplied into the regenerating column 50 from bottom, which is necessary to fluidize the bed of the soiled purifying material within the regenerating column 50, can also be reduced in comparsion to the washing liquid supplied in the arrangement shown in FIG. 1.

The following example demonstrates an advantage of the side-by-side arrangement of the columns 10 and 50, is presented only for the purpose of illustration.

EXAMPLE III

As shown in FIG. 4, the shut-off valve B assembly having a bore size of 50 mm. was installed in a portion of the connecting piping 32' immediately below the transfer port 16, the connecting piping having a 40 mm. internal diameter and being 4 m. in length. A transport liquid supply piping, 15 mm. in internal diameter, was connected to the connecting piping 32' at a position immediately below the valve assembly B. The length of the connecting piping was 2 m. A compressed air supply piping, 10 mm. in internal diameter, was connected to the connecting piping at a position 300 mm. spaced from the open end of the connecting piping which is communicated to the top of the regenerating column. The regenerating column was of a construction having a hollow cylindrical body, 150 mm. in internal diameter and 800 mm. in height, and a downwardly tapered area 52, 150 mm. in height, integral with the bottom of the hollow cylindrical body.

The liquid to be purified was prepared from lake water to which polyaluminum chloride as an inorganic coagulant was added (in an amount of 4.6 p.p.m. in terms of $Al_2O_3$) to allow the suspended solids to coagulate and therefore, contained the suspended solids in a concentration of 13 p.p.m. This liquid was supplied into the purifying column so as to flow upwardly at a rate of 6.3 $m^3/h$ through the bed of purifying material. The purifying material employed in the purifying column was a mass of filtering particles having an effective particle size of 0.9 mm. and a uniformity coefficient of 1.4. The liquid so passed through the purifying bed within the liquid treating column and purified therein contains the suspended solids in a concentration of not more than 1 p.p.m.

While the purification of the liquid was continued in the above described manner, some of the filtering material within the liquid treating column was periodically discharged at intervals of 30 minutes from the transfer port 16 into the connecting piping through the valve assembly B and, at the same time, the transport liquid, which was a purified liquid discharged from the liquid treating column, was supplied under pressure into the connecting piping to transport the solid filtering material in the form of a slurry toward the regenerating column. Simultaneously with the supply of the transport liquid, compressed air of a pressure of 0.7 $kg/cm^2G$ was supplied into the connecting piping at a rate of 7 N $m^3/h$.

After a predetermined amount of the soiled filtering material had been loaded into the regenerating column, the washing liquid, which was a purified liquid discharged from the liquid treating column, was supplied into the regenerating column through the discharge port 56 at a rate of 17 $m^3/h$, that is, so as to flow upward through the bed of the soiled filtering material within the regenerating column at an upflow velocity of 100 m/h, for 60 seconds. The total amount of the washing liquid employed was 28 liters. During the supply of the washing liquid in the manner described above, the filtering particles within the regenerating column were fluidized and the suspended solids separated from the filtering particles were forced to disharge to the outside through the overflow trough 86 together with the used washing liquid.

The amount of the suspended solids sticking to the discharged filtering material and the liquid discharged together with the filtering material was 4.3 to 4.7 g/lit. of soiled filtering material. From this, since the concentration of the suspended solids contained in the regenerated filtering material was 0.03 g/lit. of filtering material, it was clear that more than 99% of the suspended solids could be removed from the soiled filtering particles during the regeneration of the filtering material. In addition, the concentration of the suspended solids contained in the remaining liquid within the regenerating column after the washing liquid had been discharged to the outside of the regenerating column was found to be not more than 1 p.p.m.

As a result, the ratio between the amount of the liquid to be purified and the amount of the liquid discharged is 90 times, thereby to cause the concentration of the suspended solids to 90 times, and the amount of the liquid discharged was about 4 times the amount of the used filtering material.

The results of experiments conducted by varying the amount of the transport liquid, the amount of the filtering material, etc., are tabulated below.

TABLE

| | | | |
|---|---|---|---|
| Rate of Flow of Transport Liquid (m³/h) | 1.5 | 1.0 | 0.5 |
| Duration of Supply of The Transport Liquid (second) | 30 | 35 | 43 |
| Amount of Transport Liquid (liters) | 12.5 | 9.7 | 6.0 |
| Amount of Liquid Discharged Together With Used Filtering Material (liters) | 5.0 | 6.5 | 7.8 |
| Amount of Filtering Material Discharged (Bulk Amount) (liters) | 8.6 | 9.4 | 9.4 |
| Amount of Liquid Remaining Within Column 50 (liters) | 9.8 | 9.4 | 9.4 |
| Amount of Washing Liquid Used (liters) | 37.5 | 35.3 | 35.3 |

As hereinbefore described, the apparatus according to the embodiment shown in FIG. 4 is advantageous in that the efficient purification of the used purifying material can be performed with a minimum possible amount of the transport liquid and also a minimum possible amount of the washing liquid. As is the case with the apparatus shown in FIG. 1, the sequence of operation of the apparatus can advantageously be controlled by the use of a timer according to a program set in the timer.

In the embodiment shown in FIG. 5, the purifying column 10 has an auxiliary separator tank, generally indicated by 91, mounted on the top of the purifying column 10 in a manner which will now be described with reference to FIG. 5.

The auxiliary separator tank 91 is a substantially elongated hollow vessel 90a having an upper end opening and a lower end downwardly tapered as at 91b. The bottom of the downwardly tapered area 90b is connected to a supply pipe 93 which in turn extends into the interior of the purifying column 10 through the supply port 14. The end of the feed-back conduit 68 (FIG. 1) remote from the discharge port 56 in the regenerating column 50 is communicated to a supply port 91c in the tank 90 at a position substantially intermediate of the height of the cylindrical vessel 91a. The separator tank 90 includes piping 94 extending within the separator tank 91 which has a first end 94a supported at a predetermined position (as will be described later) below the level of the top opening of the tank 91 and a second end 94b extending outwardly through the wall of the tank 91 at a location beneath the first end 94a of the piping 94.

In the construction so far described, the slurry, composed of the regenerated purifying material and the transport liquid and fed through the feed-back conduit 68 as best shown in FIG. 1, is supplied into the separator tank 91 through the supply port 90c. With the slurry so supplied into the tank 91, it is clear that the regenerated purifying material tends to sediment toward the bottom of the tank 91 on one hand and the transport liquid overflows into the first end 94a of the piping 94 and is discharged to the outside of the tank 91 through the piping 94. In practice, the supply piping 93 provides a constricted passage for the flow of the liquid and, therefore, the liquid within the separator tank 91 mainly overflows into the piping 94 in the manner described above rather than flowing downward into the purifying column 10 through the supply piping 93, thus restricting the entry of the liquid into the purifying column 10.

On the other hand, the liquid outlet 22 in the purifying column 10 is communicated to a discharging piping 96 to which a siphon breaker 98 is connected. The siphon breaker 98 is in the form of a pipe having an upper end communicated to the atmosphere and a lower end communicated to a substantially intermediate portion of the discharging piping 96 which is located at a predetermined level as will be described later. As shown in FIG. 5, the discharging piping 96 extends from the liquid outlet 22 first in a direction substantially perpendicular to the longitudinal axis of the purifying column 10, then in a direction upward and parallel to the longitudinal axis of the column 10 toward the highest level, and finally in a direction downwards parallel to the longitudinal axis of the column 10, thereby substantially representing an inverted shape of the figure "U".

The highest level occupied by the substantially intermediate portion of the discharging piping 96 is positioned below the first end 94a of the piping 94 and is spaced a predetermined distance "h" from the first end 94a of the piping 94. It is to be noted that the distance "h" is a head drop corresponding to a pressure loss which takes place during the flow of the liquid from the collector 24 to the highest level of the discharging piping 96. That is, the distance "h" is selected so as to substantially establish the following equation.

$$h = \Delta Pa + \Delta Pb$$

wherein $\Delta Pa$ represents a pressure loss occurring in the liquid collector 24, that is, the screened pipe, and $\Delta Pb$ represents a pressure loss occurring during the flow of the liquid from the screened pipe 24 to the junction between the discharging piping 96 and the siphon breaker 98. This means that the distance "h" is selected to have a certain positive margin $\alpha$ that, even when the rate of supply of the liquid to be purified into the purifying column 10 varies, the liquid which has been purified in the purifying column 10 will not flow into the separator tank 91. That is, $h = \Delta Pa + \Delta Pb + \alpha$. On the other hand, in order to avoid the flow of the transport liquid within the separator tank 90 into the purifying column 10, the distance "h" should be selected to have a certain negative margin.

Figure 6:
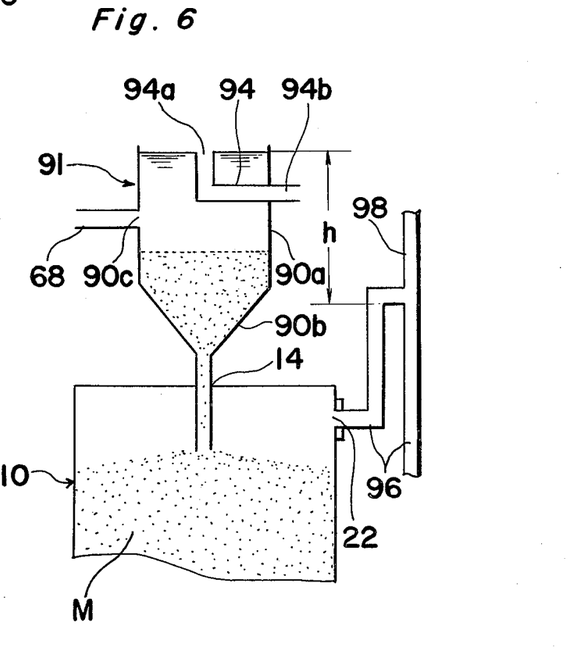

When the liquid collector 24 is not employed and the liquid outlet 22 is defined in the purifying column 10 at a position above the uppermost surface of the purifying bed within the purifying column 10 such as shown in FIG. 6, the distance "h" is determined to be the sum of the pressure loss $\Delta Pb$ plus the margin $\alpha$.

Because of the particular positioning relation between the first 94a of the piping 94 and the highest level of the discharging piping 96 as hereinbefore fully described, the flow of the transport liquid within the separator tank 91 into the purifying column 10 or the flow of the liquid within the purifying column 10 into the separator tank 91 can be minimized, even when the rate of supply of the liquid to be purified into the purifying column 10 fluctuates during the normal operation of the apparatus. Moreover, because of the provision of the supply pipe 93 which serves as a constricted passage imparting a resistance to the flow of the liquid from the separator tank 91 into the column 10 and vice versa, the possibility that the liquid within the separator tank 91 will be mixed with the liquid within the purifying column 10 is also minimized. Accordingly, in an apparatus wherein the purifying column 10 is constructed as shown in FIG. 5 or 6, during the transportation of the slurry, composed of the regenerated purifying material and the transport liquid, through the transport conduit 68, the suspended solids still sticking to the regenerated purifying particles are separated therefrom into the transport liquid. The separated suspended solids are subsequently, after having been supplied into the separator tank 91, removed from the separator tank through the piping 94 without substantially entering into the purifying column 10 through the supply piping 93.

Figure 5:
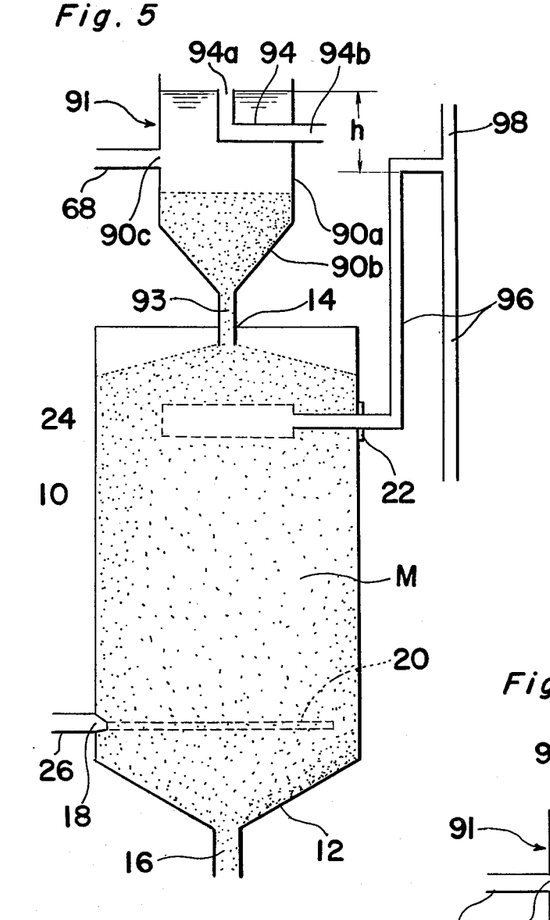
FIGS. 5 and 6 are schematic longitudinal sectional views of further modified forms of the liquid treating column wherein an auxiliary separator tank is employed.

The following example demonstrates an advantage of the apparatus wherein the purifying column 10 of the construction shown in FIG. 5 is employed. This example, like the others, is only for the purpose of illustration.

EXAMPLE IV

The experiment was conducted with a countercurrent liquid-solid contacting apparatus having the purifying column 10 with a 600 mm. internal diameter, a separator tank with a 300 mm internal diameter mounted on the top of the purifying column, and the supply piping 92 with a 50 mm. internal diameter. The distance shown by "h" in FIG. 5 was 20 cm.

With this apparatus, a batch of the used purifying material, 10 liters in amount, was periodically discharged at intervals of 30 minutes from the transfer port 16 and was washed to remove 90% of the suspended solids from the filtering particles. The regenerated, that is, washed, filtering material was fed back to the separator tank 91 at intervals of one cycle of 30 minutes by the use of the purified liquid, which contained the suspended solids in a concentration of 0.5 p.p.m. The amount of the purified liquid used as the transport liquid was 100 liters and the transportation of the regenerated filtering material back into the separator tank 91 was completed in 1.5 minutes. The concentration of the suspended solid contained in the transport liquid flowing into the separator tank 90 through the supply port 90c was 25 p.p.m.

On the other hand, when the liquid to be purified, which contained the suspended solids in a concentration of 10 p.p.m., was supplied into the purifying column 10 through the liquid inlet 18 at a rate of 5.6 m³/h, the purified liquid containing the suspended solids in a concentration of 0.5 p.p.m. could be discharged through the piping 96 at a rate substantially approximating to the rate of supply of the liquid to be purified into the purifying column. Since the pressure losses occurring in the screened collector pipe 24 and the piping 96 were 15 cm. in terms of water head, the margin of 5 cm. was taken into consideration in determining the position of the first end 94a of the piping 94.

Because the concentration of the suspended solids in the purified liquid would have theoretically been not less than 1 p.p.m. if the transport liquid containing 25 p.p.m. of suspended solids were mixed with the total amount of the purified liquid, the rate of removal of the suspended solids as a whole was lowered to 90% due to admixture of the transport liquid even though 100% of the suspended solids was removed from the liquid to be purified during the flow of the latter through the filtering bed within the filtering column 10.

From the foregoing, with the apparatus wherein the purifying column is constructed as shown in FIG. 5 or 6, since the purified liquid containing the suspended solids in a concentration of 0.5 p.p.m. was obtained through the discharging piping 96 at a rate approximating to the rate of the supply of the liquid to be purified into the purifying column, there was no possibility that the purified liquid would be mixed with the transport liquid even though the transport liquid, forming a part of the slurry together with the regenerated purifying material and flowing through the feedback conduit 68, contained the suspended solids in a concentration of 25 p.p.m.

Although the present invention has been fully described in connection with the preferred embodiments thereof with reference to the accompanying drawings and by way of the examples, it is to be noted that various changes and modifications are apparent to those skilled in the art. For example, in the construction of the liquid treating column 10 shown in FIG. 3, the second structural element or elements 80 may not be always necessary. In this case, arrangements may be made to allow the liquid supply piping 26 to extend through the liquid inlet 18, which in this case is located at a lower portion of the column 10 such as shown in FIG. 1, and then to bend downwards centrally of the column 10 so as to open towards the bottom of the column 10 in substantial alignment with the transfer port 16.

Alternatively, it is also possible to design the second structural element or elements 80 be supported in position within the interior of the column 10 by means of arms radially outwardly extending between the or each element 80 and the wall of the column 10 while the liquid supply piping 26 extends through the liquid inlet 18, positioned such as shown in FIG. 1, and then is bent so as to open toward the bottom of the column 10 in substantial alignment with the transfer port 16.

Accordingly, such changes and modifications are to be understood as included within the true scope of the present invention unless they depart therefrom.

What is claimed is:

1. An apparatus for purifying a liquid by countercurrent liquid-solid contact and for regenerating a purifying material used to purify the liquid, said apparatus comprising:
   a liquid treating column having a bed of purifying material in the form of a mass of purifying particles filled in said liquid treating column, the uppermost surface of said purifying bed being spaced a predetermined distance from the top of said liquid treating column to provide therebetween a vacant space;
   said liquid treating column having at the top and bottom thereof a material inlet and a material outlet, respectively;
   said liquid treating column having at respective lower and upper portions thereof a liquid inlet and a liquid outlet, said liquid inlet being positioned above said material outlet and adapted to be connected to a source of liquid to be purified, whereby said liquid to be purified is introduced through said liquid inlet into said purifying bed and passes upwardly therethrough while being purified, thereby forming purified liquid;
   liquid collector means, positioned within the liquid treating column and connected to said liquid outlet, for collecting said purified liquid and for withdrawing said purified liquid from the interior of said liquid treating column through said liquid outlet, but not permitting the passage of particles of said purifying material;

said liquid collector means being completely embedded within said bed of purifying material within said liquid treating column, the amount of said purifying material within said liquid treating column being selected such that an upper portion of said purifying bed, situated above said liquid collector means, forms a settling layer which alone acts on the remaining lower portion of said purifying bed below the level of said liquid collector means to form means for preventing any possible fluidization and/or expansion of the purifying particles forming said remaining lower portion of said purifying bed during upward passage therethrough of said liquid;

said liquid collector means and said liquid outlet being free of connection to said vacant space between said top of said liquid treating column and said uppermost surface of said purifying bed;

a regenerating column having defined in top and bottom portions thereof a material inlet and a material outlet, respectively, for regenerating said purifying material after soiling thereof in said liquid treating column;

connecting piping means, having a first end connected to said material outlet in said liquid treating column and a second end connected to said material inlet in said regenerating column, for transferring a soiled lower portion of said purifying material from said liquid treating column to said regenerating column;

liquid discharge means in said regenerating column for withdrawing liquid to be used to wash said soiled purifying material from the interior of said regenerating column;

an exhaust piping connected to said material outlet of said regenerating column;

transport conduit means, having a first end connected to said exhaust piping and a second end connected to said material inlet of said liquid treating column, for transferring said purifying material, which has been regenerated within said regenerating column, through said material inlet of said liquid treating column;

means for supplying compressed air into said regenerating column for a predetermined period of time for fluidizing said soiled purifying particles, which have been soiled by suspended solids separated from the liquid purified in said liquid treating column, and for causing said suspended solids to separate from said soiled purifying particles;

means for supplying a washing liquid into said regenerating column for a predetermined period of time for fluidizing said soiled purifying particles to enhance the separation of said suspended solids therefrom, for then transporting the thus separated suspended solids upwardly through the fluidized bed of soiled purifying particles, and for washing said soiled purifying particles within said regenerating column, the thus separated suspended particles and washing liquid being discharged to the outside of said regenerating column through said liquid discharge means; and means, installed between said exhaust piping and said transport conduit means, for transporting the regenerated purifying material through said material inlet in said liquid treating column and onto the top of said purifying bed within said liquid treating column.

2. An apparatus as claimed in claim 1, wherein said predetermined period of time during which said compressed air is supplied is shorter than said predetermined period of time during which said washing liquid is supplied.

3. An apparatus as claimed in claim 1, wherein the supply of said washing liquid is initiated subsequent to termination of the predetermined period of time during which said compressed air is supplied.

4. An apparatus as claimed in claim 1, further comprising a timer-controlled level sensor means for generating an electric signal in response to fall of the uppermost surface level of said washing liquid within said regenerating column which takes place subsequent to expiration of a predetermined period of time set in a timer for controlling said level sensor means, said washing liquid supply means being brought into inoperative position in response to the application of said electric signal from said level sensor means thereto, thereby interrupting the supply of said washing liquid.

5. An apparatus as claimed in claim 4, further comprising transfer valve means, disposed within said connecting piping means, and adapted to be opened, in response to expiration of a predetermined period of time set in a timer for controlling said transfer valve means, to allow a portion of said soiled purifying particles to be transferred into said regenerating column through said connecting piping means.

6. An apparatus as claimed in claim 1, further comprising transfer valve means, disposed within said connecting piping means, and adapted to be opened, in response to expiration of a predetermined period of time set in a timer for controlling said transfer valve means, to allow a portion of said soiled purifying particles to be transferred into said regenerating column through said connecting piping means.

7. An apparatus as claimed in claim 1, further comprising hollow ring-shaped rectifier means, positioned within said regenerating column adjacent the bottom thereof, for facilitating the fluidization of said soiled purifying particles in cooperation with said compressed air and said washing liquid supplied into said regenerating column, and for causing said purifying particles adjacent said recifer means to flow in upward and outward and then downward and inward circulation paths.

8. A method of substantially purifying a liquid by countercurrent liquid-solid contact and of regenerating a purifying material used to purify the liquid, said method comprising:

passing liquid to be purified upwardly through a bed of purifying material which is in the form of a mass of purifying particles filled within a liquid treating column and thereby purifying said liquid to form purified liquid;

withdrawing said purified liquid from said purifying bed through a liquid collector located within said liquid treating column at a position adjacent an upper portion thereof and below the top of said purifying bed;

maintaining said liquid collector at a position within said purifying bed such that an upper portion of said purifying bed, which is situated above the level of said liquid collector, alone acts on the remaining lower portion of said purifying bed below the level of said liquid collector and presses said lower portion downwardly, thereby avoiding any possible fluidization and/or expansion of said purifying particles forming said remaining lower portion of said purifying bed during upward passage therethrough of said liquid;

maintaining said liquid collector free of connection to the interior of said liquid treating column at a position above the upper surface of said purifying bed;

transferring a soiled lower portion of said purifying material within said liquid treating column, which has been soiled by suspended solids contained in said liquid being purified, from the bottom of said liquid treating column into a regenerating column by way of connecting piping extending between said bottom of said liquid treating column and the top of said regenerating column, said connecting piping having therein transfer valve means adapted to be opened to allow the transfer of said soiled lower portion of said purifying material toward said regenerating column;

supplying compressed air for a predetermined period of time into said regenerating column and thereby fluidizing the soiled purifying particles which have been transferred from said liquid treating column;

supplying a washing liquid for a predetermined period of time into said regenerating column from said bottom thereof and thereby flowing said washing liquid upwardly through the bed of said soiled purifying particles and washing said soiled particles within said regenerating column and thereby increasing the fluidization of said soiled purifying particles;

withdrawing said washing liquid and suspended solids separated from said soiled purifying particles out of said regenerating column through a liquid outlet defined in said regenerating column at an upper portion thereof;

interrupting the supply of said compressed air and said washing liquid into said regenerating column and discharging regenerated purifying material from the bottom of the regenerating column; and transporting the thus regenerated purifying material so discharged from said regenerating column toward the top of said liquid treating column and onto the top of said purifying bed within said liquid treating column.

9. A method as claimed in claim 8, wherein the supply of said liquid to be purified into said liquid treating column is interrupted during the transfer of said soiled purifying particles toward said regenerating column.

10. A method as claimed in claim 8, wherein said predetermined period of time during which said compressed air is supplied into said regenerating column is shorter than said predetermined period of time during which said washing liquid is supplied into said regenerating column.

11. A method as claimed in claim 8, wherein the supply of said washing liquid into said regenerating column is initiated subsequent to termination of said predetermined period of time during which said compressed air is supplied.

12. A method as claimed in claim 8, wherein the supply of said liquid to be purified into said liquid treating column is reduced during the transfer of said soiled purifying particles toward said regenerating column.

13. A method as claimed in claim 8, wherein the supply of said regenerated purifying material from said regenerating column into said liquid treating column is effected intermittently.

14. A method as claimed in claim 8, wherein the withdrawal of said washing liquid from said regenerating column is effected after an uppermost surface level of said washing liquid has attained a predetermined level a predetermined number of times.

15. A method as claimed in claim 8, wherein the withdrawal of said washing liquid from said regenerating column is effected by utilization of a siphon.

* * * * *